United States Patent [19]
Jackson

[11] 3,750,807
[45] Aug. 7, 1973

[54] UNLOADER FOR STORAGE BINS
[76] Inventor: William J. Jackson, P.O. Box 266, Mendota, Ill. 61342
[22] Filed: Nov. 8, 1971
[21] Appl. No.: 196,469

Related U.S. Application Data
[62] Division of Ser. No. 77,263, Oct. 1, 1970, Pat. No. 3,647,094.

[52] U.S. Cl. ............................................. 214/152
[51] Int. Cl. .......................................... B65g 65/46
[58] Field of Search ...................... 214/17 DA, 152

[56] References Cited
UNITED STATES PATENTS
| | | |
|---|---|---|
| 2,736,461 | 2/1956 | Dueringer et al. .......... 214/17 DA X |
| 3,490,617 | 1/1970 | Mast et al. ...................... 214/17 DA |
| 3,356,235 | 12/1967 | Laidig ............................ 214/17 DA |

Primary Examiner—Robert G. Sheridan
Attorney—Greek Wells et al.

[57] ABSTRACT

The unloader uses a combination of a plurality of auger and casing units arranged end to end and separably coupled together in a circular bin which has a floor provided with a center outlet sump leading to any means to carry loose granular material from the sump. A power unit connected to the first auger, is mounted in the sump so it can be rotated on a vertical axis that is on the central axis of the bin. The power unit also includes a hydraulic pump. The casings have openings in one side with manually removable doors for them so that grain may be received by or blocked out of the augers. The first casing carries a tank for hydraulic fluid near the pump. Near the end of the casing remote from the sump, a drive and support unit carries the casing and is hydraulically driven. The second auger and casing unit is separably coupled to the first auger and casing unit and extends axially beyond it. It also has near its outer end a drive support unit essentially like the one on the first auger. The hydraulis drive coupling to the pump is such that when the first auger and casing unit is separated from the second auger and casing unit, this will limit the supply of fluid to the hydraulic motor of the first drive and support unit so it can be used to cause the first casing unit to travel around the sump and remove the material from the center of the bin while the second unit remains buried in the pile of material in the outer portion of the bin. Unloading a bin by this method keeps the outward pressure on the entire circumference of the bin wall until center annular areas of the bin floor have been cleared and the outward pressure is lowered to a safe level.

4 Claims, 14 Drawing Figures

UNLOADER FOR STORAGE BINS

This is a division of application Ser. No. 077,263 filed Oct. 1, 1970, now U.S. Pat. No. 3,647,094.

BACKGROUND OF THE INVENTION

In recent years the grain trade has demanded larger grain storage units — mainly vertical type structures. Circular bins of over 100 feet diameter and as much as 40 feet high vertical walls have been built. Such a structure presents unusual problems in unloading. Side unloading puts such uneven strains on the walls as to be impractical so unloading through a central downwardly directed discharge outlet is necessary. Initial unloading is desirably accomplished in such a way as to avoid excess strain.

In a search through the prior patents, it was found that Laidig, U.S. Pat. No. 3,356,235, broadly discloses a silo bin with a central discharge well and a two section auger means rotatable about the axis of the bin to bring the bin contents to the central outlet. Other prior patents of general interest are the following U.S. Pats.: Laidig, No. 25,863; Hein, No. 2,914,198; Robinson, No. 1,482,524; Schaefer, No. 3,084,814; Martin, No. 2,551,217; Glenn, No. 3,233,755; Greaves, No. 2,763,362; and Stone, No. 3,351,395.

The Laidig U.S. Pat. No. 3,356,235 apparently is closer to the present invention than the other patents.

PURPOSE OF THIS INVENTION

The purpose of the present invention is to provide an apparatus for unloading loose granular material from a large circular bin through a central outlet in the bin which apparatus uses a plurality of separable auger units arranged end to end radially outward from the bin center axis with power means at the bin center to drive the augers, and individual drives on each auger unit for advancing them around the bin, the whole apparatus being capable of being submerged in the loose granular material and left there from the time of filling the bin until the bin contents are to be removed.

It is a more specific purpose of this invention to provide the apparatus with access front doors to the augers individually removable as the auger removes the material over the auger closest to the bin center thus preventing initial overloading of the auger.

It is a further purpose of the invention to provide an unloading apparatus having end to end separable auger units each with its own advancing mechanism operable upon any part of the bin floor that is reasonably smooth from the outer wall of the bin to the central outlet.

GENERAL DESCRIPTION

A preferred form of the invention is shown in the accompanying drawings, wherein.

Figures 1, 2:
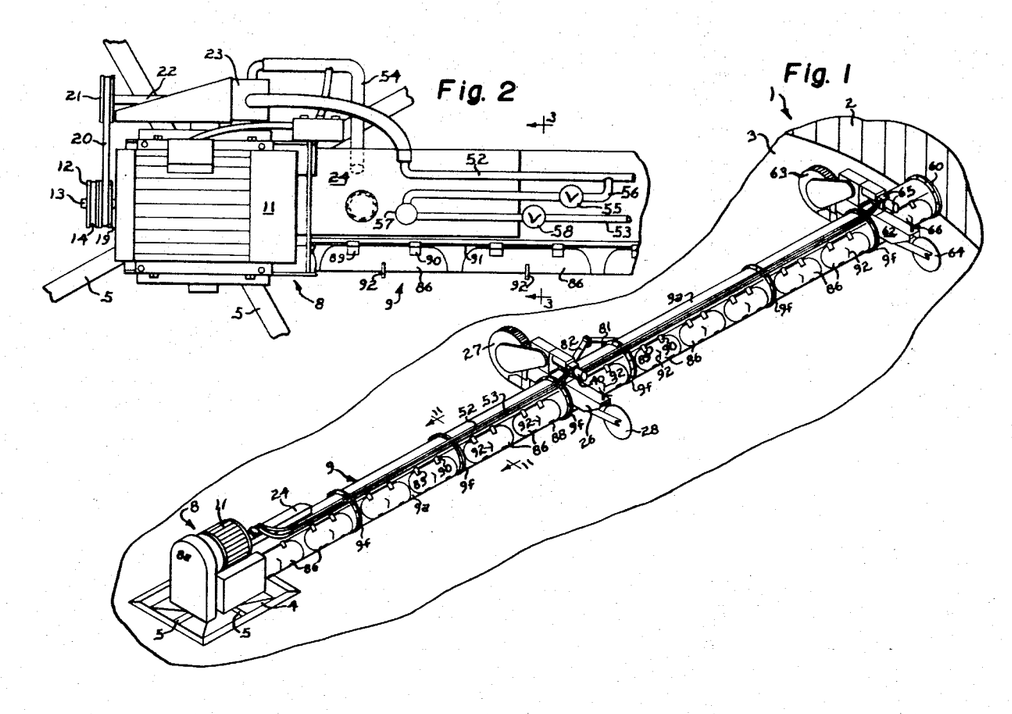
FIG. 1 is a perspective view of the apparatus showing a portion of the bin floor, a portion of the upright wall of the bin, and the central outlet through which the bin contents are removed downwardly.
FIG. 2 is a plan view of that portion of the apparatus which includes the power unit for operating the auger and the pump and part of the first auger unit.
Figure 3:
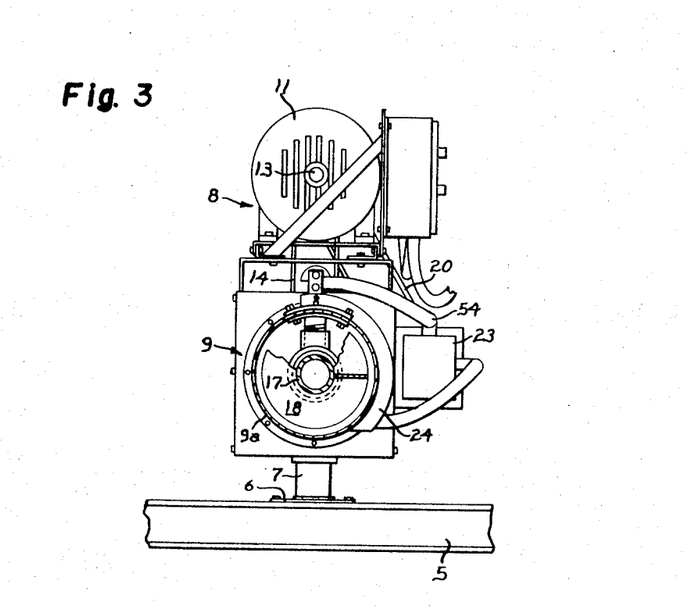
FIG. 3 is a sectional view taken on the line 3—3 in FIG. 2.

Referring now in detail to the drawings and to FIGS. 1, 2 and 3 in particular, the apparatus is shown in connection with a grain storage bin 1 having a circular side wall 2 and a floor 3. The floor 3 needs to be smooth and devoid of projections so that the grain stored in the bin can be cleaned out most easily. At the center of the floor 3 there is an outlet sump 4 extending downward through which the grain is removed. Any conventional conveyor can be used to carry away the grain moving down through the outlet sump 4.

Within the outlet sump 4, a framework 5 is provided to support a bearing assembly 6 for the pivot pin 7. This pivot pin 7 mounts a housing and support 8 for the delivery end of an auger unit 9 so that they may rotate about the center of the bin 1.

Figure 6:
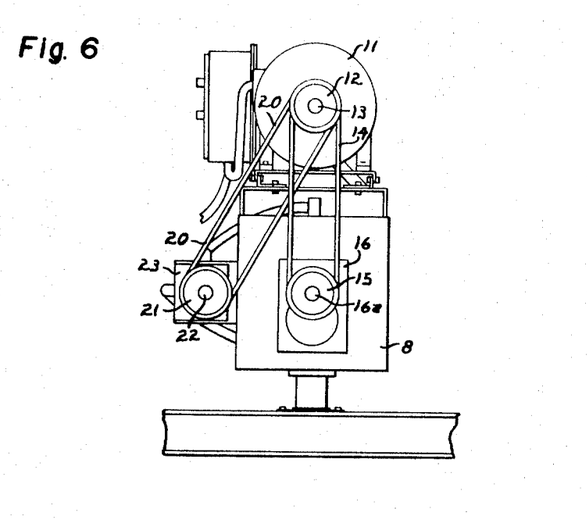
FIG. 6 is an end view, with the cover removed, of the power unit.

The housing 8 supports a drive motor 11. A pulley 12 (FIG. 6) on the motor shaft 13 drives a belt 14 to a pulley 15 on the shaft 16a of a reducing gear assembly 16 in the housing 8 which drives a shaft 17 for an auger 18 in the auger unit 9. Another pulley 19 on the motor shaft 13 drives a belt 20 that drives a pulley 21 which is fixed on a pump shaft 22. The shaft 22 drives a pump 23 to provide hydraulic fluid under pressure from a tank 24 for use in causing the auger unit 9 to travel around the bin. A cover 8a encloses the belts and pulleys.

Figure 4:
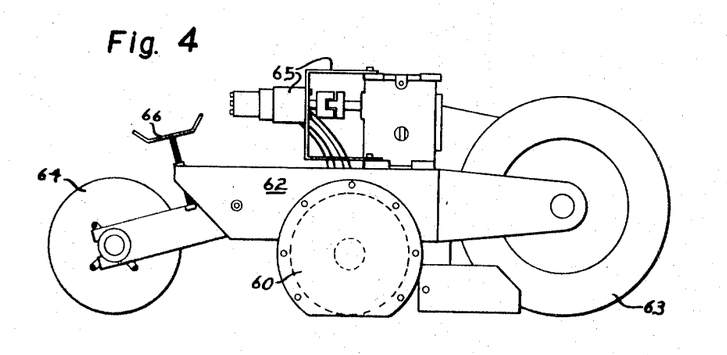
FIG. 4 is an enlarged end view of the outer end of the second auger unit and showing the drive mechanism by which it is caused to move around the bin.
Figure 5:
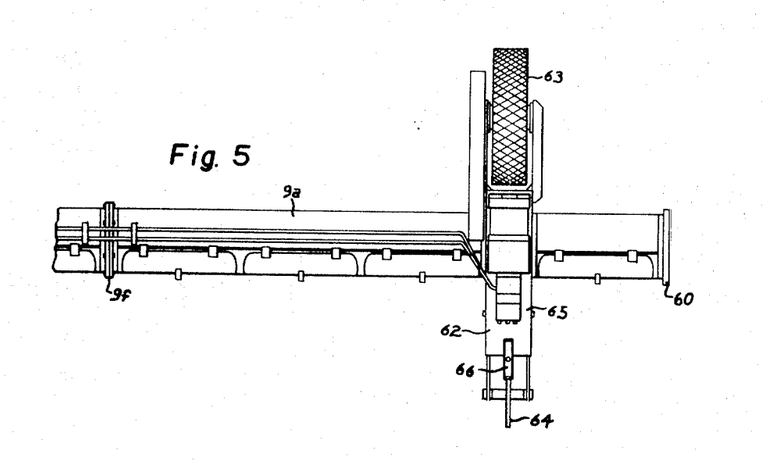
FIG. 5 is a plan view of a portion of the second auger unit and its drive mechanism.
Figure 7:
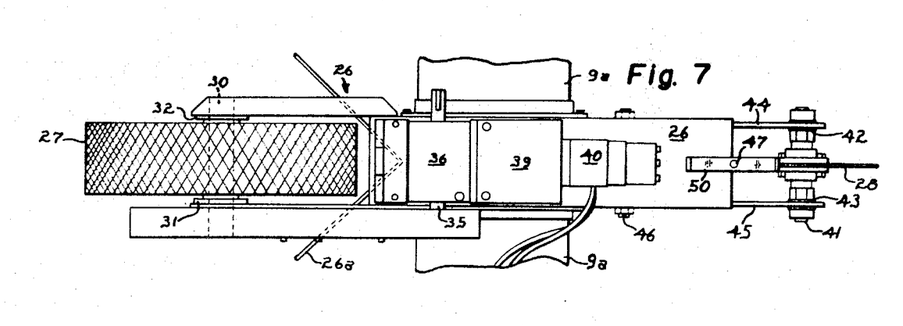
FIG. 7 is a plan view on an enlarged scale of the drive mechanism for the first auger unit.
Figure 8:
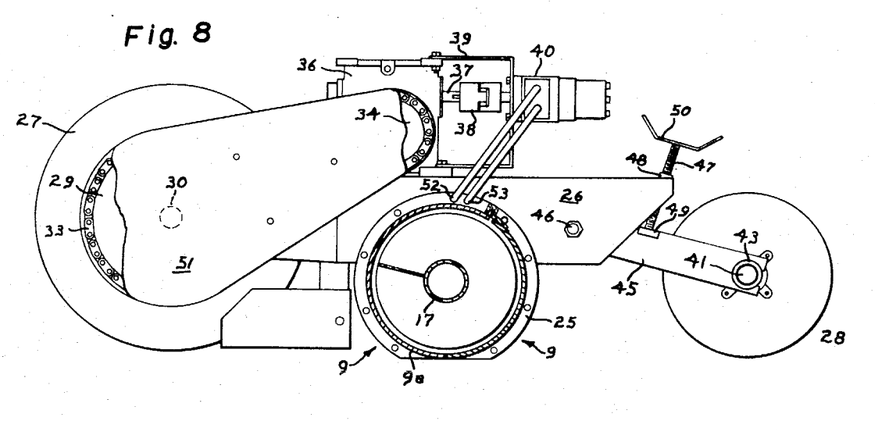
FIG. 8 is a side view of the mechanism shown in FIG. 7.
Figure 9:
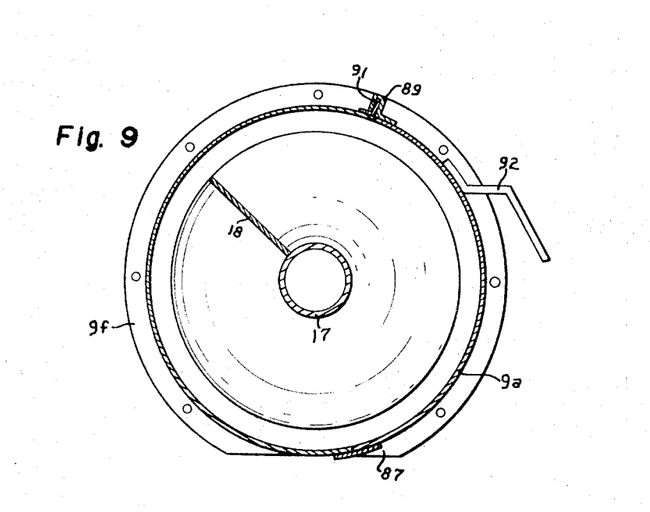
FIG. 9 is an enlarged cross-sectional view through the first auger unit taken along line 9—9 of FIG. 10.
Figure 10:
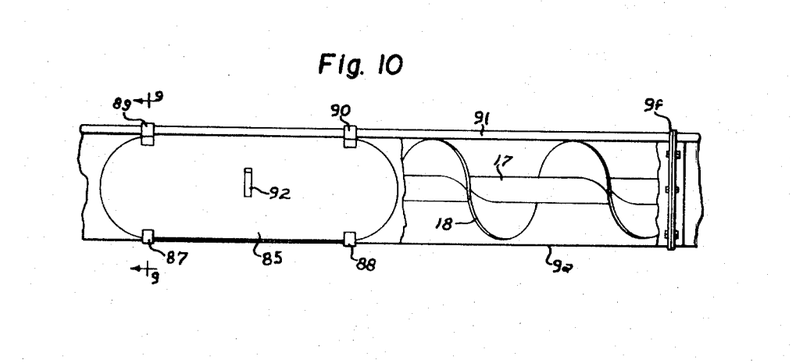
FIG. 10 is a side view of a part of the first auger unit with a part of the auger casing broken away.

The mechanism for causing the auger unit 9 to travel around the bin is best shown in FIGS. 4, 7 and 8. This means embodies a framework 26 that carries the outer end 25 of the casing 9a of the auger unit 9. At one end the framework 26 is supported by a rubber tired drive wheel 27. At the other end the framework 26 is supported for limited vertical adjustment by a thin, material dividing wheel 28. The drive wheel is operated by a chain drive utilizing a sprocket wheel 29 on a wheel axle 30 that is journalled in bearings 31 and 32. The bearings carry the rear end of the framework 26. The sprocket wheel 29 is driven by a roller chain 33, which in turn, is driven by a sprocket wheel 34 on the output shaft 35 of a reduction gear unit 36. The input shaft 37 of the gear unit 36 is coupled by a clutch 38 to a hydraulic motor 40 carried by a bracket 39 on the framework 26. The material dividing wheel 28 is mounted to the framework 26 by an axle 41 which is journalled in bearings 42 and 53 in a pair of arms 44 and 45 that are pivoted by a shaft 46 in the framework 26. These arms can be adjusted up and down about the shaft 46 by a screw 47 threaded into a block 48 in the adjacent end of the framework 26 and bearing on a cross bar 49 connecting arms 44 and 45. The screw 47 has a handle 50. The sprockets and chain are covered by a housing 51. A V-shaped blade 26a is suspended from the frame 26 in front of the wheel 27 to clear the wheel path.

Hydraulic fluid is directed to the hydraulic motor 40 from the pump 23 via a pipe 52 mounted on the casing 9a of the unit 9. Fluid is returned from the hydraulic motor 40 to the tank 24 via a pipe 53 also mounted on the casing 9a. The pump 23 receives fluid from the tank 24 through a pipe 54. Valved branch pipes 52b and 53b lead to the motor 40 from the pipes 52 and 53.

To control the fluid supply to the motor 40 an overflow valve 55 is provided in a by-pass pipe 56 that leads from the pipe 52 to an inlet 57 to the tank 24. The return pipe 53 has speed control valve 58 therein, which, by regulating the amount of fluid returned from the motor 40 to the tank inlet, controls the speed of the motor 40.

Figure 12:
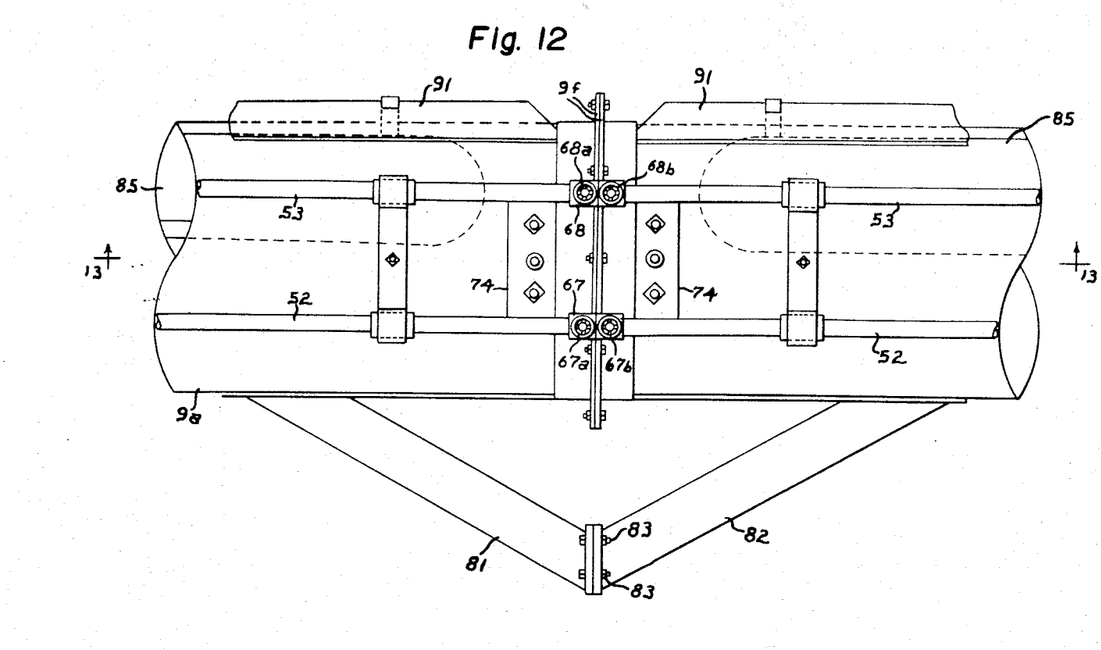
FIG. 12 is an enlarged plane view of the auger unit showing the separable connection of the inner half of the unit with the outer half thereof.
Figure 13:
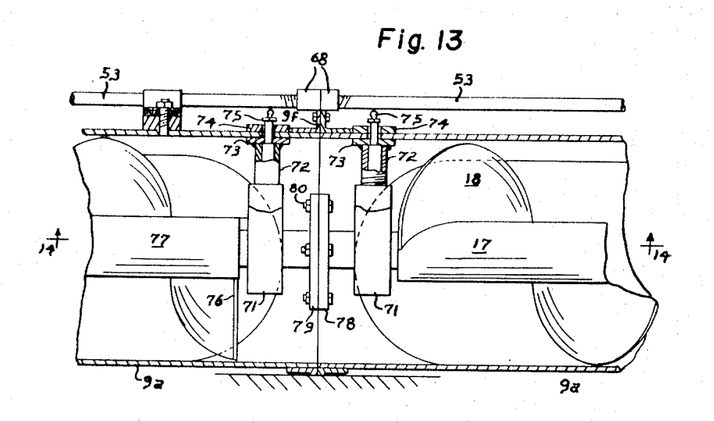
FIG. 13 is a sectional view on the line 13—13 of FIG. 12.

The casing 9a is made up of a plurality of flanged sections, the flanges of which are identified as 9f. An end cap 60 closes the end of the auger casing at the end next to the wall 2 of the bin. Near the wall 2 there is a second drive mechanism similar in all respects to the drive mechanism already described. It has a framework 62 which is carried by a drive wheel 63 and a material dividing wheel 64. A second hydraulic motor 65 supplies power to drive the wheel 63. The wheel 64 can be moved up and down relative to the framework 62 by means of a hand operated screw 66. The connecting means between the motor 65 and the drive wheel 63 are identical to those employed in connecting the hydraulic motor 50 to the drive wheel 27. The pipes 52 and 53 have connections to like pipes 52a and 53a that extend on to the motor 65 so that both motors 50 and 65 can receive fluid from pipe 52 and return the used fluid through the pipe 53. As will be described later herein, the sections of the auger unit 9 outward from the section having the drive mechanism frame 26 thereon can be disconnected from the sections inward of this frame. The pipes 52 and 53 have known quick disconnect valved couplings 67 and 68 to the pipes 52a and 53a which seal themselves when separated therein at the point of disconnection of the outer casing sections 9a of auger unit 9 from the inner sections 9a (see FIG. 12). Valves 67a and 68a, 67b and 68b are indicated in FIG. 12 as providing this capability.

The auger 18 of the unit 9 extends out to the disconnect point referred to above. It is made up of sections each of which has a hollow shaft 17 supported at both ends by hanger bearings 70 that are suspended by brackets 71 (see FIG. 11). The brackets 71 are carried by hollow stems 72 that are threaded to receive the brackets 71. The stems 72 are mounted to the casing 9a by an inner plate 73 to which the stem 72 is welded and an outer plate 74. These plates are bolted together as shown. A lubricating fixture 75 extends through the plates 73 and 74 and into the hollow stem 72 to supply lubricant to the bearing 70.

Another auger 76 is provided in the sections of the casing 9a outward from the section joint just outward of the first drive mechanism. This auger 76 is supported by hanger bearings 78 which are like the bearings 70. Means are provided to connect the shaft 77 of the auger 76 to the shaft 17 of the auger 18. Both shafts 17 and 77 are tubular. Coupling heads 78 and 79 are used to connect the two shafts 17 and 77. These heads are provided with apertures to receive connecting bolts 80. By removing these connecting bolts 80 the two shafts can be freed of each other.

Figure 11:
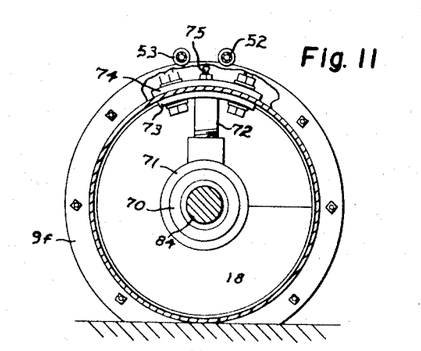
FIG. 11 is a sectional view on the line 11—11 of FIG. 1.
Figure 14:
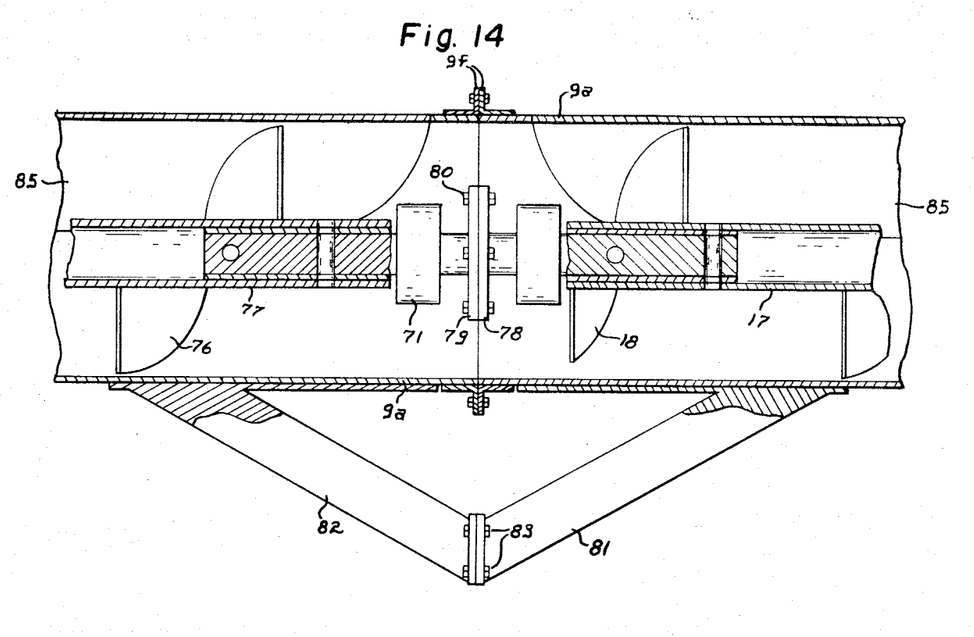
FIG. 14 is a sectional view on the line 14—14 of FIG. 13.

The sections 9a of the casing that meet at the junction of the shafts 17 and 77 are provided with stiffening braces 81 and 82 to strengthen this point in the casing 9a in a horizontal direction. The braces 81 and 82 are separably connected by bolts 83 so that they may be disconnected for the purpose of causing the inner part of the auger unit to empty the central part of the bin while the outer part of the auger unit remains covered with the granular material. When the outer part of the auger unit is then connected up to be driven it is evident that the forward thrust on the unit against the loose material would be at the coupling point where the braces 81 and 82 are provided. Additional braces such as these may, of course, be provided at any of the coupling points in the auger unit 9 where the casing 9a is shown with flanges 9f. The auger 18 and the auger 76 are preferably made in sections terminating at the flanges 9f and the hanger bearings 70 with brackets 71, stems 72 and plates 73–74 shown in FIG. 11 are provided to support the augers where the sections meet. Thus, each of the auger casings 9a and each of the augers 18 and 76 can be made up of sections of the desired length to fit the dimensions of the bins in which they are to be used. Wherever two sections of augers meet, except at the junction where the separable coupling heads 78 and 79 are used, a single length of shaft 84 is used to connect the two adjacent ends of the hollow auger shafts such as 17 and 77. This single length of shaft is pinned in the two adjacent auger shafts in the same manner that the shafts of the coupler heads 78 and 79 are pinned. The pinning is illustrated in FIG. 14.

The several casing sections 9a are provided with side doors on their advancing faces through which the bin contents may enter to the augers. Elongated apertures 85 are cut in the casing section 9a and the piece 86 cut out of the aperture is used as a closure when the side door is to be blocked. Each piece 86 is provided with two lower stop members 87 and 88 which are positioned to engage the outer surface of the section 9a just below the aperture 85. Each piece 86 has a pair of top hooks 89 and 90, which engage over an upstanding rib 91 that extends the entire length of each casing section 9a. A handle 92 is provided on each piece 86.

In the operation of my invention the entire unloader is set up complete in the bin 1 before the filling begins. It is made strong enough to withstand being covered by the granular material as the bin is filled. The side door pieces are put in place so that the whole unloader is buried as the bin is filled. When the bin is to be emptied the grain in the outlet sump 4 is moved out until the drive motor 11, the pump equipment, and their controls are exposed. The motor is then started so as to operate the auger 18. The side door 86 closes to the sump 4 is opened first and when the grain adjacent to it is removed by the auger 18 the next door 86 is removed and then the next door until all of the doors 86 out to the end of the auger 18 have been removed. The overflow valve 55 is then closed and the speed control valve 58 is adjusted to cause the hydraulic motor 40 to turn the drive wheel 27 at the proper speed for keeping the auger 18 adequately filled with grain as the auger 18 makes a complete revolution about the pivot pin 7.

The foregoing operation removes the central portion of the grain in the bin 1. This relieves the outward pressure on the bin to such an extent that it is now possible to unload the balance of the bin by connecting the auger 76 and the outer sections of the casing 9a to the auger 18 and the inner sections of the casing 9a. Before the bin 1 was filled the auger 76 was disconnected from the auger 18 and the casing 9a and braces 81 and 82 were unbolted at the junction of the augers to allow travel of the entire inner unit, consisting of the auger 18, the casing sections 9a around it and the drive unit consisting of framework 26, hydraulic motor 40 and wheels 27 and 28. The pipes 52 and 53 were also uncoupled at 67 and 68.

When coupling is made after using the inner auger 18 to unload the central portion of the bin 1 the side doors 86 of the sections of the inner casing 9a are replaced and with the overflow valve 55 open the augers 18 and 76 are rotated to remove the overburden from the outer sections of the casing 9a. The side doors 86 are removed as the overburden is removed until the outer sections and the outer wheeled support are uncovered. The pipes 52 and 53 are then connected and opened to the pipes 52a and 53a. Upon closing the overflow valve 55 fluid will be fed to the outer hydraulic motor 65 to drive the wheel 63 and advance the outer end of the casing 9a. The valves 52b and 53b are adjusted to control the flow to the motors 40 and 65 so that both drive wheels can be used to advance the outer casing sections as the grain is removed by the augers 76 and 18. The advance of the entire casing 9a is continued until all of the grain is removed from the bin 1.

It is believed that the nature and advantages of my invention will be clear from the foregoing description.

Having thus described my invention, I claim:

1. A method for removing loose granular material from a storage bin of the type having an unobstructed circular storage floor bounded by upright peripheral walls and having a central material-receiving sump recessed within the floor, wherein the entire floor area is covered by loose granular material extending upwardly along the walls, comprising the following steps:

first moving all granular material vertically above the sump by operation of the material-receiving sump;

next removing all granular material within the boundaries of the wall and located vertically above a first annular floor area centered about the sump and extending radially outward intermediate the sump and walls by clearing the first annular floor area of granular material and directing such material radially inward to the material-receiving sump, while not disturbing granular material on the remaining annular floor area located radially outward of the first annular floor area; and finally removing the granular material remaining vertically above the remaining annular floor area and extending to the walls by clearing the remaining annular floor area of granular material and directing such material radially inward to the material-receiving sump.

2. A method as set out in claim 1 wherein granular material is first removed from above the first annular floor area along a radial line extending outward from the center of the floor and is subsequently removed annularly about the center of the floor in a circular path.

3. A method as set out in claim 2 wherein granular material is first removed from about the remaining annular floor area along a radial line extending outward from the center of the floor and is subsequently removed annularly about the center of the floor in a circular path.

4. A method as set out in claim 1 wherein granular material is first removed from above the remaining annular floor area along a radial line extending outward from the center of the floor and is subsequently removed annularly about the center of the floor in a circular path.

* * * * *